US006944355B2

United States Patent
Lupien, Jr. et al.

(10) Patent No.: US 6,944,355 B2
(45) Date of Patent: Sep. 13, 2005

(54) APPARATUS AND METHODS FOR AUTOMATICALLY ADJUSTING IMAGES ON EDGE-DISTURBED OUTPUT MEDIA

(75) Inventors: Gordon F. Lupien, Jr., Ontario, NY (US); Craig A. Smith, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 653 days.

(21) Appl. No.: 10/046,161

(22) Filed: Jan. 16, 2002

(65) Prior Publication Data

US 2003/0133162 A1 Jul. 17, 2003

(51) Int. Cl.$^7$ .................................................. G06K 9/40
(52) U.S. Cl. ...................... 382/275; 382/260; 382/266; 358/3.26; 358/3.27
(58) Field of Search ................................ 382/260, 266, 382/275, 284, 112, 204, 216, 252, 274; 358/3.26, 3.27, 452, 463, 1.2

(56) References Cited

U.S. PATENT DOCUMENTS

| | | | | |
|---|---|---|---|---|
| 4,316,199 A | * | 2/1982 | Greenig et al. | 347/249 |
| 5,017,963 A | | 5/1991 | Tuhro | |
| 5,444,799 A | * | 8/1995 | Hirono et al. | 382/287 |
| 5,850,478 A | * | 12/1998 | Suzuki et al. | 382/204 |
| 5,923,788 A | * | 7/1999 | Rao | 382/275 |
| 6,122,393 A | * | 9/2000 | Schweid et al. | 382/112 |
| 6,166,394 A | * | 12/2000 | Rubscha | 250/559.42 |
| 6,594,401 B1 | * | 7/2003 | Metcalfe et al. | 382/275 |

* cited by examiner

Primary Examiner—Bhavesh M. Mehta
Assistant Examiner—Yosef Kassa
(74) Attorney, Agent, or Firm—Oliff & Berridge, PLC

(57) ABSTRACT

The invention describes a method for preventing the loss of portions of a copied image when output media having edge disturbances, or virtual edge disturbances, are used. Such media can include hole-punched paper, transparencies with non-imaging stripes, or paper that will be hole punched at a later time. Image loss may be minimized or prevented by reducing or offsetting the image. When output media with an edge disturbance is detected, an image forming apparatus can adjust the images to compensate for the disturbances.

20 Claims, 8 Drawing Sheets

APPARATUS AND METHODS FOR AUTOMATICALLY ADJUSTING IMAGES ON EDGE-DISTURBED OUTPUT MEDIA

BACKGROUND OF THE INVENTION

1. Field of Invention

The invention relates to methods and apparatus for automatically adjusting reproduced images on edge-disturbed output media.

2. Description of Related Art

Systems to prevent the undesired imaging of document apertures by an imaging system are known in the art. See, for example, U.S. Pat. No. 6,166,394, to Rubscha. Common examples of document apertures include punched holes in pre-punched or user-punched paper sheets, tears, and dog-ears. When copies of documents bearing these apertures are made, these apertures come out as black, relatively darkened, or relatively lightened anomalies in the image of various shapes, such as dots or circles, on the copies. Systems have been developed that automatically remove such anomalies, where such apertures were present in the original document.

Various processes are known in the art for recognizing and eliminating the hole patterns in the originals to be imaged. See, for example, U.S. Pat. No. 5,017,963, to Tuhro. However, this does not address the situation where an image is to be formed on output media having an edge disturbance.

SUMMARY OF THE INVENTION

When edge-disturbed output media are used in an image forming apparatus, portions of the original document image can potentially be lost. Such media can include, but are not limited to, hole-punched paper and transparencies having a non-imagable stripe along the edge. Generally, the loss of information is not immediately apparent to the user. It is not until a later time, when the user needs to refer to the information in a binder or is presenting the information on an overhead, that the loss of the data becomes apparent. By the time the user realizes that the information is missing, it may be too late to correct the loss of the data, even though the original may still be available. Alternatively, the original may be unavailable, lost, or destroyed. Thus, the user has no ability to restore the lost portions of the images. However, if the user is initially alerted to the problem, or potential problem, such inopportune, and potentially embarrassing, loss of information can be avoided.

This invention provides systems and methods for automatically adjusting the placement of at least a portion of an image to be formed on a sheet of output media based on the location of the non-imagable areas on the sheet.

The invention separately provides systems and methods for determining when a sheet of edge-disturbed output media having one or more non-imagable areas is to be used as the output media.

This invention separately provides systems and methods for determining a type of adjustment and/or a magnitude of adjustment usable to adjust the placement of at least a portion of the image relative to the non-imagable areas of the sheet of output media.

This invention separately provides systems and methods for determining which portion or portions of the image need to have their placement relative to the non-imagable areas of the sheet of output media adjusted.

In various exemplary embodiments of the systems and methods according to this invention, the user may be queried whether the selected output media is an edge-disturbed output media. Alternatively, in various other exemplary embodiments, the image forming apparatus either inputs the state of a user input parameter that indicates if the selected output media is edge-disturbed or automatically analyzes the selected output media to determine if the selected output media is edge-disturbed.

In various exemplary embodiments, for a light-lens type image forming apparatus, once the image forming apparatus knows the output media is edge-disturbed, a predetermined scale factor is applied to the input document to reduce the size of the image of the input document so that the image of the input document will fit in a portion of the output media that excludes the non-imagable area. In various other exemplary embodiments, the image forming apparatus automatically determines a scale factor based on the dimensions of the input document and the selected edge-disturbed output media. This scale factor is then used to fit the image of the input document into the portion of the output media that excludes the non-imagable area.

In various exemplary embodiments, for a copier or a printer that has the ability to analyze the actual image content of the input document, more flexible control over the placement of the output image on the sheet of output media is possible. The input document or image may be reduced and/or shifted to avoid the non-imagable area of the sheet of edge-disturbed output media. In various exemplary embodiments, if the content of the input image is known or determinable, only those portions of the input image that are directly affected by the non-imagable areas are reduced and/or shifted relative to the non-imagable areas of the edge-disturbed output media.

These and other features and advantages of this invention are described in, or are apparent from, the following detailed description of various exemplary embodiments of the systems and methods according to this invention to reduce the loss of data from an image when it is copied onto such edge-disturbed media.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Figure 1:
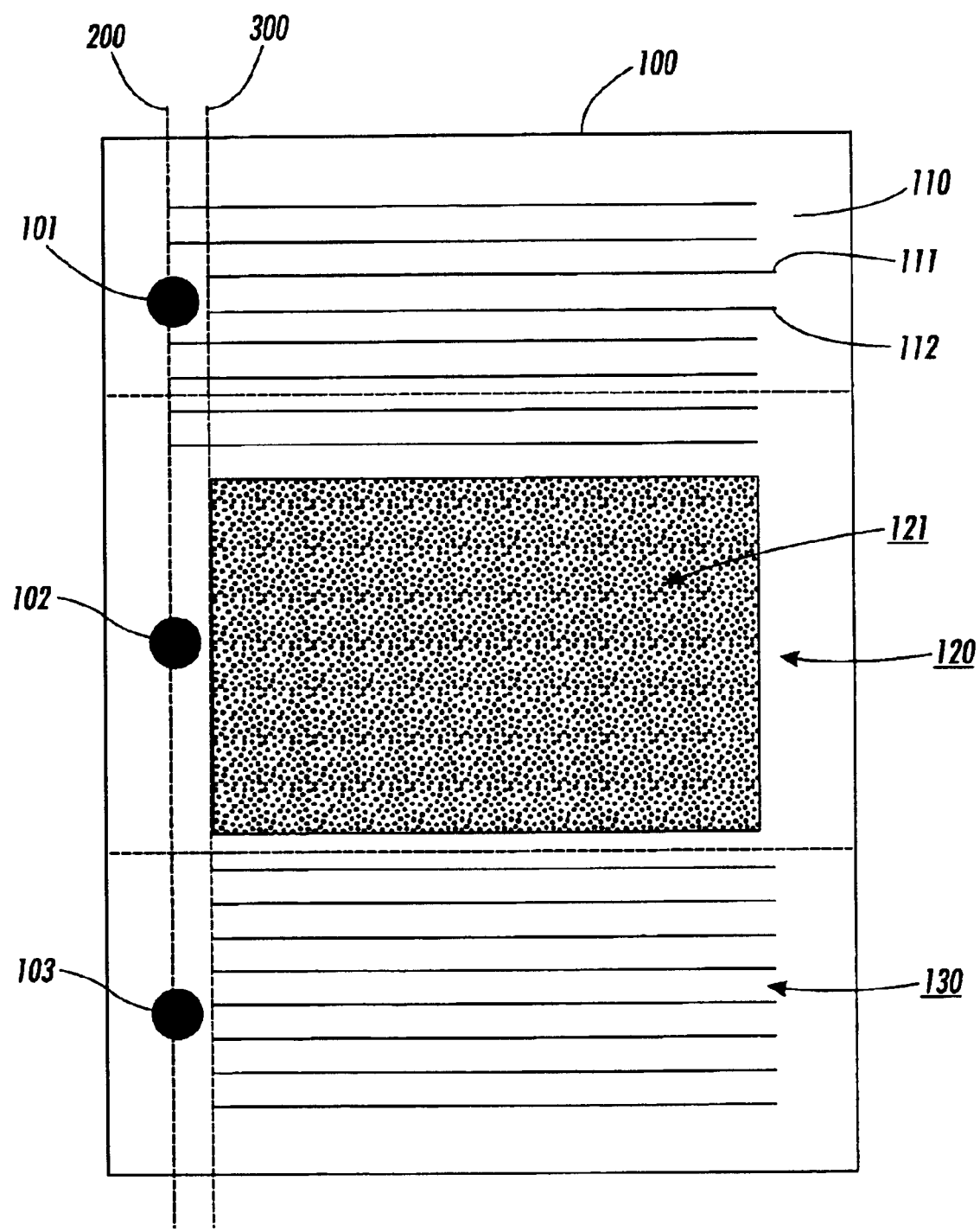
FIG. 1 illustrates one exemplary embodiment of a sheet of edge-disturbed output media.

As used herein, the term "output media" refers to any type of tangible medium upon which an image forming apparatus can produce an image. Examples of "output media" include, but are not limited to, paper and transparencies. It should be understood that the systems and methods of this invention may be used with any presently known or later-developed type of output media.

The term "edge disturbance" and "edge-disturbed" refers to any perturbation in a region or sheet of output media that results in an effective loss of image data when attempting to form an image in that region of the sheet of output media. Examples of an edge disturbance include holes punched in the margins of the output media or transparencies bearing a non-imagable strip along the edge of the transparency. In general, such holes or non-imagable strips or areas are located on the left or top edges of the sheet of output media.

It should be appreciated that the systems and methods of the invention can also be adapted to make adjustments for "virtual edge disturbances". In the following detailed description "virtual edge disturbances" refer to areas of the output media where an effective loss of image data is anticipated or expected to occur. The image may be adjusted using the same processes based on the presence of actual edge disturbances or based on edge disturbances that will, or are expected to, occur after the image has been formed on the output media. For example, a user may intend to hole-punch the margin of an output media in which no edge disturbances are currently present. In anticipation of this action, the user may select the appropriate adjustment of the image so that there is no loss of the image data when the holes are later punched in the output media. Thus, the systems and methods of this invention can be used with any type of output media that has a non-imagable area, or potentially will have a non-imagable area, located anywhere on the sheet of output media.

The term "document" or "documents" refers to any material or substance in which information can be stored and/or transferred. Examples of documents encompassed by this invention include conventional tangible documents (e.g., reports, memos, drawings, photographs, etc.) or the electronic/digital data representing such images. In general, these documents may be manifest in a physical medium, such as paper, or on a diskette. However, the term "document" may also encompass image data that is present within a computer (e.g., a program file). The systems and methods of this invention can be adapted for use with any type of document of which an copy is to be imaged onto an edge-disturbed output media.

The term "net output media area" is the area of the sheet of output media upon which an image can suitably be formed in view of an actual or virtual edge disturbance. In various exemplary embodiments, this can be roughly equal to the total area of the sheet of output media, less the portion(s) of the media unavailable for imaging due to the edge disturbances or that are otherwise unavailable for imaging.

In various other exemplary embodiments, either the entire input image data, or only the affected portions of the input image data, may be adjusted by reducing the size of the image or of one or more portions of the image. The image, or one or more portions of the image, may be adjusted by setting some reduction value on an image forming apparatus so that the resulting image or image portions are smaller and are able to fit in the net output media area. In various other exemplary embodiments of the systems and methods of this invention, reducing the image may be the default method of adjusting the image, particularly if shifting the image is not available. Reducing the image or certain portions of the image may be preferable where the aspect ratio and/or relative positioning of the image needs to be preserved, as with photos or specially formatted text.

In various exemplary embodiments, the entire image, or one or more portions of the image, may be shifted toward the margin opposite the edge disturbance to avoid the edge disturbance. The image data may be adjusted so that the image, or only those portions of the image immediately affected by the edge disturbance, is shifted toward the opposite margin enough to avoid the edge disturbance present in the output-media.

In various exemplary embodiments, the original image, or specific portions of the original image, may also be adjusted by both reducing the image or a specific portion of the image and shifting the image or that specific portion toward the opposite margin. This method of adjusting the image may be preferable if the size of the original image is too large to fit the net output media area. If the image was not first reduced, shifting the image toward the opposite margin may result in loss of data from portions of the image that were moved too far towards the opposite margin. Thus, reducing the size of the original image would avoid the potential loss of data from portions of the image that extend into the opposite margin.

In various other exemplary embodiments of the invention, reducing the image may also be limited the to one direction (e.g., vertically or horizontally compressing the image). Compressing one dimension of the image may be desirable where, for example, the original document has fixed margins or where the original text is justified. By compressing the image, the alignment of the original image can be preserved. If the image comprised unjustified text, for example, lines of the text could be shifted or reduced on a line-by-line basis. When the aspect ratio must preserved, such as with photos or special text, the entire image can be reduced, and the entire image could subsequently be shifted.

FIG. 1 shows an image copied onto a sheet of edge-disturbed output media 100. In this case, the sheet of edge-disturbed output media 100 is a sheet of 3-hole punched paper having holes 101, 102, and 103. The original margin 200 of the image, if copied onto the sheet of output media 100 without any adjustment, would extend over the holes 101, 102, and 103. Thus, any information present in the original image at the positions of the holes 101–103 would have been lost in the image formed onto the sheet of edge-disturbed output media 100.

In FIG. 1, the sheet of edge-disturbed output media 100 is divided into three distinct portions, 110, 120, and 130. In each of the portions 110–130, to illustrate the different possible adjustments usable in the systems and methods of this invention, a different type of adjustment to the input image is made to create the output image. It should be appreciated that, in an actual use of the systems and method of this invention, the type of adjustment made can be altered as needed, based on the type of edge-disturbed output media detected. Alternatively, any desired or appropriate combination of different types of adjustment could be used.

The portion 110, which is a text area, shows that only those lines of text 111 and 112, that are adjacent to the hole 101, are adjusted. In particular, the left margin of the text lines 111 and 112 is moved away from the original margin 200 to the adjusted margin 300 to avoid the hole 101. For example, if the user is copying a set of documents with variable margins, an image forming apparatus could detect, when text data extends over the hole 101, which lines or portions of the text are affected. The image forming apparatus would then shift over only those lines, such as, in this case, the lines 111 and 112, to avoid the hole 101. In various other exemplary embodiments, the image forming apparatus may compress the text only in those areas immediately to the right of the hole 101. Thus, in the various exemplary embodiments, the initial portion of lines 111 and 112 may exhibit compressed text while the remainder of the text in the text portion 110 is unadjusted.

The second portion 120, which is primarily a graphics portion, illustrates how the position of a graphic image 121 is adjusted from the original margin 200 to the adjusted margin 300 to avoid the hole 102. In graphic images, or other images where the aspect ratio and/or the relative positioning of the different portions of the image portion should be maintained, the adjustment process must be applied to the entire portion of the image. For example, to maintain the aspect ratios, the graphic image 121 will need to be reduced in both the horizontal and vertical directions. Similarly, if adjusting the graphic image 121 involves at least shifting the graphic image 121, the entire image should be shifted, rather than shifting only those portions of the image that are directly affected by the hole 102. If the original graphic image 121 is larger than the net output media area available of the sheet of output media for imaging, a reduction in the scale of the image may also be necessary to fit the image into the available imaging space.

The third portion 130, which is also a text portion, shows how text is adjusted in a manner similar to adjusting the graphic image 121. In the third portion 130, in contrast to the text portion 110, the entire block of text has been shifted and/or reduced from the original margin 200 to the adjusted margin 300 to avoid the edge disturbance. However, since the aspect ratio does not need to be preserved for text images, it should be appreciated that the reduction of the text image in may be limited to a reduction in one direction only. In this particular case, the text may be horizontally compressed to fit the text portion 130 into the available space. This method of adjusting the image may be desirable when the original image contains lines of text having fixed margins (e.g., justified text), or under circumstances where the user may wish to preserve as much of the original layout of the text as possible. It should be appreciated that vertical compression of the text image may be used, particularly where the edge-disturbance occurs at the top or bottom margins of the output media.

It should be appreciated that the systems and methods of the invention may be adapted to adjust images when the duplexed copies are to be made. The image on the backside of the output media can be handled in the same manner as the image on the obverse side of the output media. Where appropriate, the image would simply be adjusted in the opposite direction of the obverse side. However, the process, as described below, would remain the same.

Figure 2:
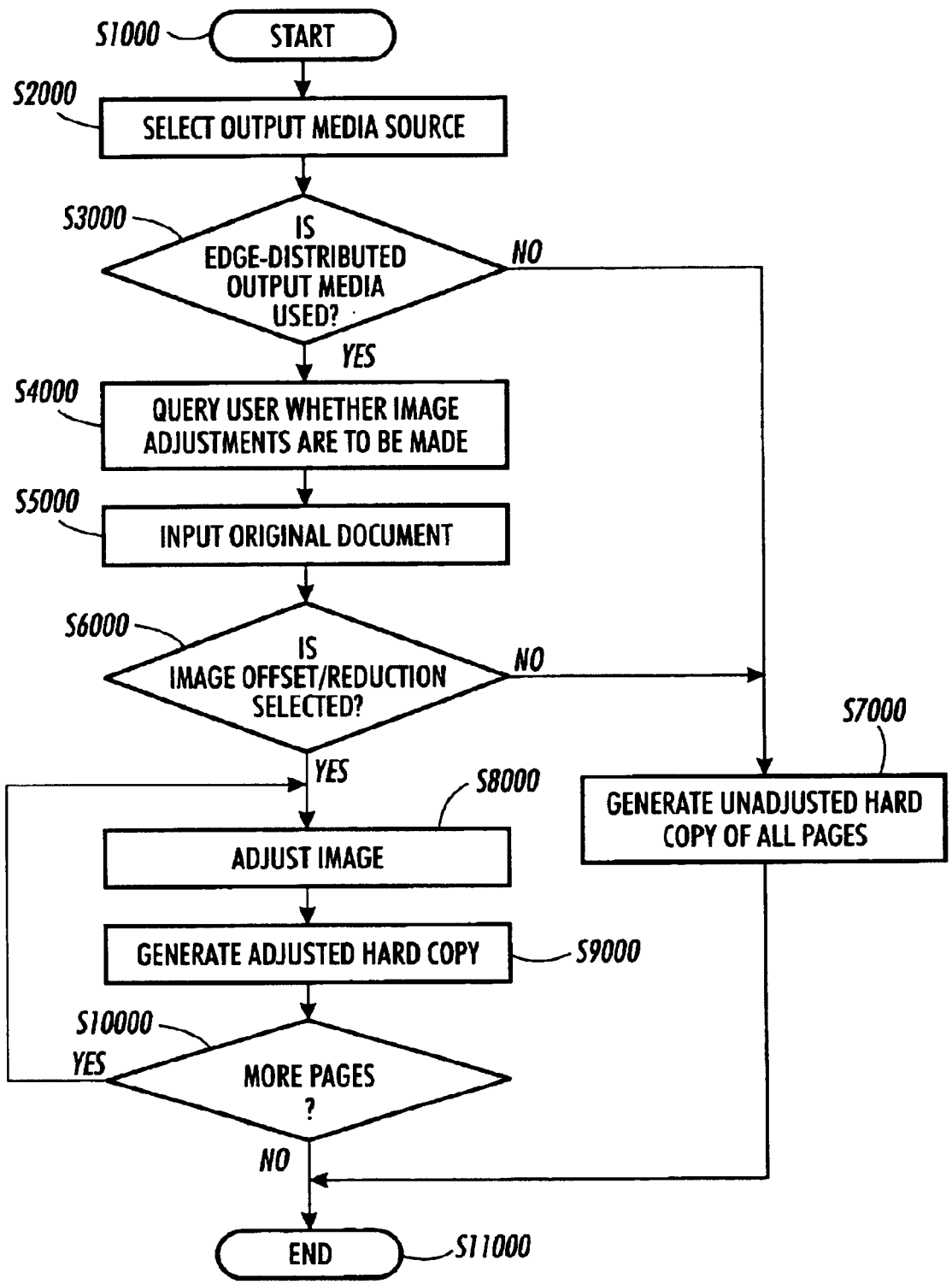
FIG. 2 is a flowchart outlining one exemplary embodiment of a method for adjusting the image data of an original that is to be copied or printed onto an edge-disturbed output media.

FIG. 2 is a flowchart outlining one exemplary embodiment of a method for adjusting an image copied onto an output media according to this invention. Beginning in step S1000, operation proceeds to step S2000, where an output media source is selected. The selected media source may contain edge-disturbed media by default. Alternatively, the selected media source may be a manual-feed source of the image forming apparatus. Then, in step S3000, a determination is made whether edge-disturbed output media is being used in the selected output source. If the user has not selected an output media source having edge-disturbed output media, operation jumps to step S7000. Otherwise, operation proceeds to step S4000.

In step S4000, because edge-disturbed output media has been detected, the user is queried whether image adjustments should be made. For example, in various exemplary embodiments, the image forming apparatus could present the user with an option to make no adjustments. In various exemplary embodiments, the user could be provided with, for example, "three hole punch adjust on/off" and/or "striped transparency adjust on/off" buttons or indicators on the user interface.

Then in step S5000, the original document is input. Next, in step S6000, a determination is made whether the user has elected to adjust the image when outputting the image onto the edge-disturbed output media. If not, operation proceeds to step S7000. Otherwise, if the image is to be adjusted, operation jumps to step S8000. In step S7000, an unadjusted hard copy is generated. Operation then jumps to step S11000.

In step S8000, the image is adjusted. Next, in step S9000, the adjusted image is output onto a sheet of the selected edge-disturbed output media. Then, in step S10000, a determination is made whether more pages need to be printed. If so, operation returns to step S8000. Otherwise, operation continues to step S11000, where operation of the method ends.

It should be understood that alerting the user to the use of edge-disturbed media and presenting the option to adjust the image accordingly in step S4000, and determining the user's response in step S6000, can be omitted. Where steps S4000 and S6000 have been omitted, the image is automatically adjusted for output onto edge-disturbed media without any input from the user. It should be understood that the user may be alerted to the image adjustments either "on-the-fly" or at the end of the job, with the adjusted pages indicated. The image forming apparatus could have a default correction mode that would produce generally acceptable results and would be somewhat intelligent. Thus, the user would not be required to inform the image forming apparatus that edge-disturbed output media was being used. By providing a default adjustment, the edge-disturbed output media detection, image adjustment and generation of the adjusted output image would be transparent to the user. The image adjustment may be set to have the least impact on the images being processed as possible by changing the images only when absolutely necessary.

It should be appreciated that the adjustment function may be selectively disabled for certain reasons, such as, for example to reduce demand on system resources or to speed up printing. In addition, the function may be disabled for certain users in their user profiles, for example, based on their usage patterns or personal preferences.

Figure 3:
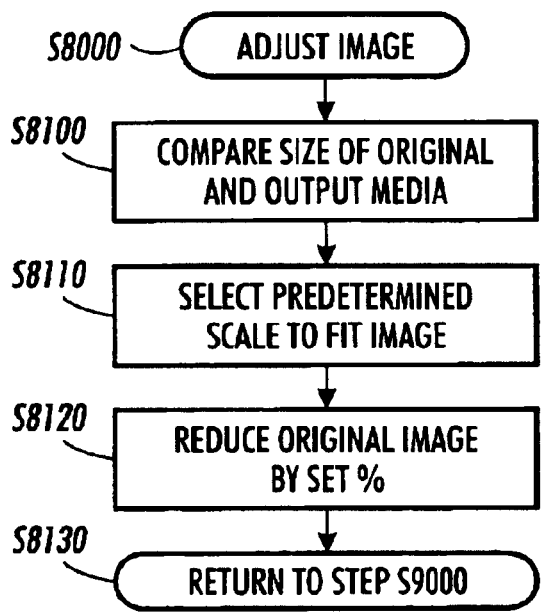
FIG. 3 is a flowchart outlining in greater detail a first exemplary embodiment of the method for adjusting the image of FIG. 2.

FIG. 3 is a flowchart outlining in greater detail a first exemplary embodiment of the method for adjusting the image of step S8000 in a conventional light-lens image forming system. For most imaging apparatus utilizing a light-lens image reproduction system, only limited options are available for adjusting an input image. Thus, in most cases, such systems are limited to only adjusting the overall size of the reproduced image. However, it should be appreciated that these methods may also be applied to current, or later-developed, light-lens systems that are capable of shifting the image.

Beginning in step S8000, operation proceeds to step S8100, where the size of the input document media is compared with the size of edge-disturbed output media. The image is adjusted using a set of pre-determined reduction factors, based on a comparison of the input media area and the net output media area available. For example, one value in the set of pre-determined reduction factors would be based on a comparison of a letter size sheet of input media with the output image area available on a letter size sheet of output media with three holes punched in the left margin.

Next, in step S8110, the operation selects the appropriate pre-determined reduction factor, based on the comparison of the size of the original document media, and the net output area available in the edge-disturbed output media. In step S8120, the operation reduces the size of the original document by the selected percentage to fit the original document image onto the edge-disturbed output media. Once the image has been reduced, operation proceeds to step S8130, where operation returns to step S9000.

If the edge disturbance is known or detected by the user, the user may set the value of reduction on the image forming apparatus so that the adjusted images fit in the net output media area. It should be understood that this option may be implemented by having the user select, for example, "three hole punch adjust on/off" or "striped transparency adjust on/off" in addition to the buttons or indicators of output media size present in the user interface. Thus, the appropriate reduction factor can also be determined between, for example, regular and hole punched legal, A4, or B5 sized paper, and even between media of different sizes, such as letter size and hole-punched A4, or vice versa. It should be appreciated that in these various exemplary embodiments, the image would be initially reduced to fit the different sized media, and may be further reduced, if necessary, to account for the edge disturbance.

Figure 4:
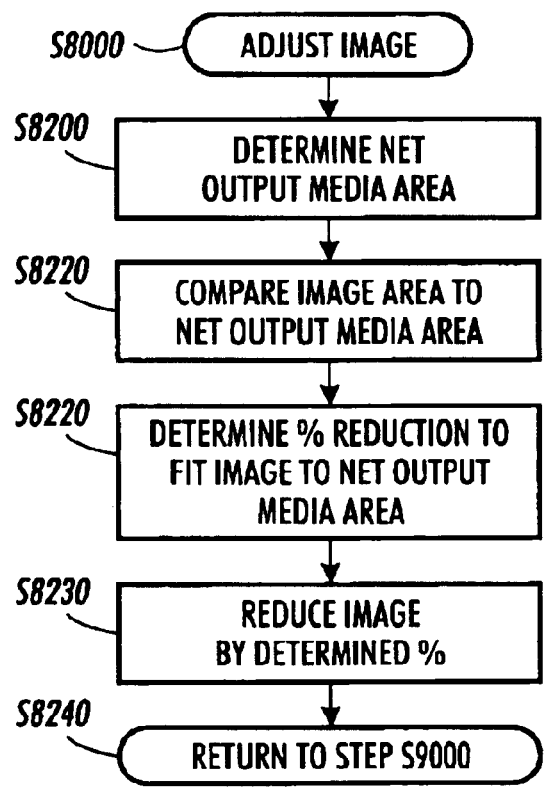
FIG. 4 is a flowchart outlining in greater detail a second exemplary embodiment of the method for adjusting the image of FIG. 2.

FIG. 4 is a flowchart outlining in greater detail a second exemplary embodiment of the method for adjusting the image of step S8000 in a light-lens image forming system having a more sophisticated control system available for manipulating image data. Beginning in step S8000, operation proceeds to step S8200, where the net output media area of the selected output media is determined. As defined above, the net output media area is the area of the output media available for imaging less the area of the edge-disturbance. In step S8210, the original document area is compared with the determined net output media area. Next in step S8220, the operation determines the percent reduction required to fit the image into the net output media area. Then in step S8230, the image is reduced by the determined percentage. Operation then proceeds to step S8240, where operation returns to step S9000. It should be understood that once the reduction scale has been determined, it is not necessary to adjust the scale unless dimensions of the original document or output media has been changed.

In various alternative embodiments, output media of non-standard sizes may also be used. When the user selects output media having a different or nonstandard size and/or such a non-standard sized output media is detected, the size of the net output media area is determined as described in steps S8200 above. The net output media area and the original document area are again compared to arrive at the appropriate reduction factor. Thus, in these various embodiments, the reduction amount or percentage may be adjusted based on a real-time determination of the net output media area available. It should be appreciated that various embodiments of the invention may also be adapted to permit similar adjustments to be made when originals of non-standard sizes are used.

Figure 5:
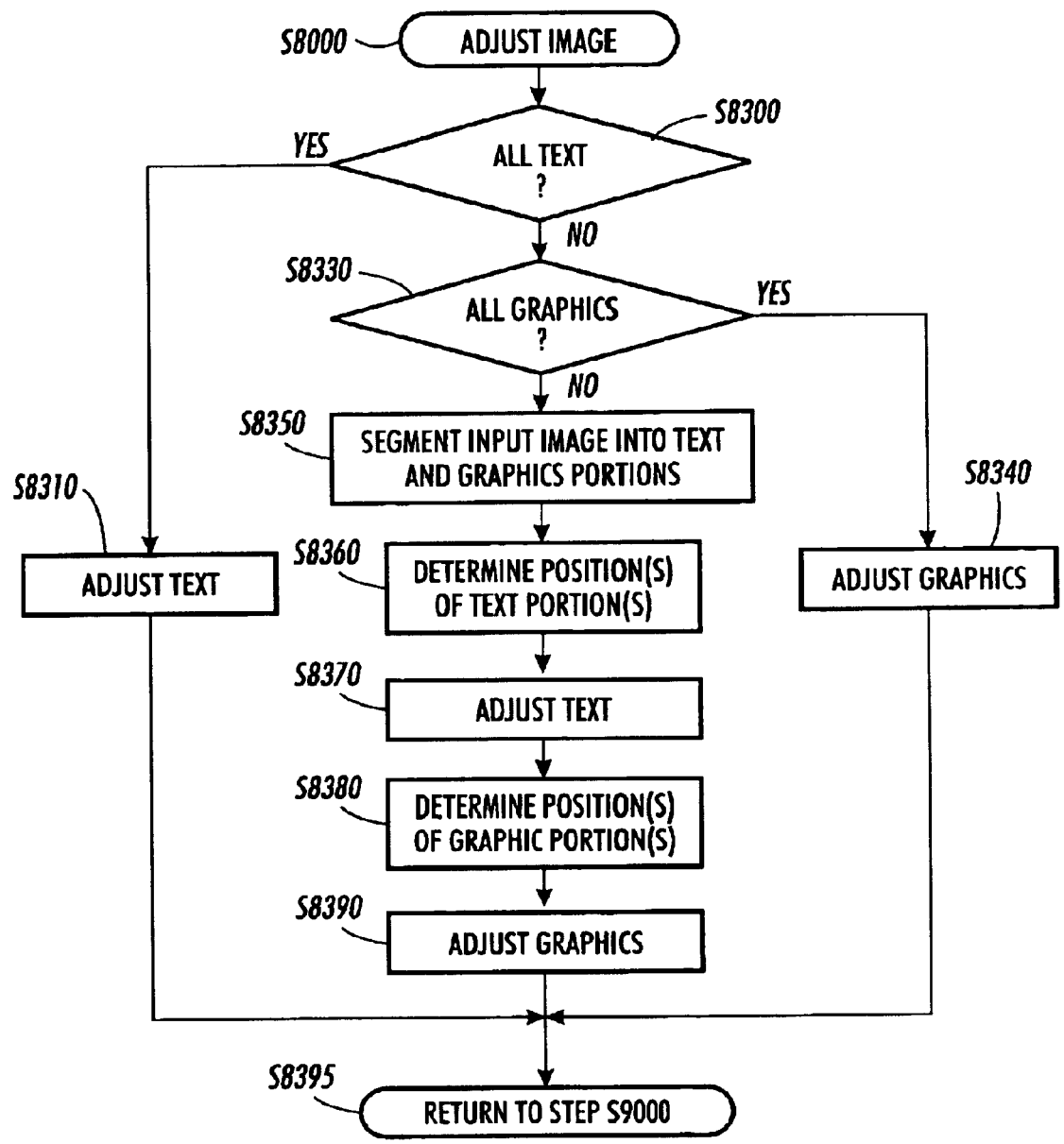
FIG. 5 is a flowchart outlining in greater detail a third exemplary embodiment of the method for adjusting the image of FIG. 2.

FIG. 5 is a flowchart outlining in greater detail one exemplary embodiment of adjusting the image of step S8000 in a digital image forming apparatus. It should be appreciated that a digital image forming apparatus provides significantly greater flexibility and image handling options. Beginning in step S8000, operation proceeds to step S8300, where a determination is made whether the image includes only text. If so, operation proceeds to step S8310. Otherwise, operation jumps to step S8330. In step 8310, the text image is adjusted appropriately relative to the net image area of the edge-disturbed output media. Operation then jumps to step S8395.

In contrast, in step S8330, a determination is made whether the image includes only graphics. If the image includes only graphics, operation proceeds to step S8340. Otherwise, operation jumps to step S8390. In step 8340, one or more of the graphic image(s), on the page are adjusted relative to the net image area on the edge-disturbed output media. Operation then jumps to step S8395.

In contrast to both steps S8310 and S8340, since the input image includes both text and graphics, in step S8350, the image data is segmented and classified. Then in step S8360, the position(s) of the text portion(s) of the image are determined. Next, in step S8370, zero, one or more of the text portions are adjusted accordingly. Operation then proceeds to step S8380.

In step S8380, the position(s) of the graphic portion(s) of the image are determined. Next, in step S8390, zero, one or more of the graphic portions of the image are adjusted. Operation then continues to step S8395, where operation of the method returns to step S9000. It should be appreciated that the order in which the presence of text, graphics or a mix of both are determined, as well as the adjustment to the text and graphics portions of the images, may be done in any order.

It should be appreciated that the digital image forming apparatus permits text and graphic images to be handled differently. The digital image forming apparatus is capable of discriminating between the different types of images. Thus, for example, if the image was a photograph, the entire photograph portion may be shifted or reduced in order to preserve its aspect ratio. The image segmenter described in U.S. Pat. Nos. 5,850,474 and 6,240,205, each incorporated by reference in its entirety, illustrates how photograph portions versus text portion of an image can be distinguished. The image processing subsystem could be programmed to implement the image changes on the fly based on the output of the image segmenter combined with margin detection and standard hole positions. Thus, in a digital image forming apparatus, increased flexibility in adjusting the image to avoid the edge disturbance is possible. The method for avoiding the edge disturbance would be based on the type of output media and the margins of the input image.

For example, if the user is copying a set of documents with variable margins, the digital image forming apparatus could detect when text or image data would extend over the edge disturbance. In response, the digital image forming apparatus could shift the image just enough to avoid the edge disturbance. Reducing the image may be a desirable if the width of the image precludes shifting the image toward the opposite margin, or if the opposite margin is too small to accommodate the intrusion of the shifted image. In addition, the digital image forming apparatus could reduce only those areas that extend into the edge disturbance and leave the rest of the image unadjusted, as shown above in the text portion 110 of FIG. 1. Where the aspect ratio needs to be preserved, as with photo or specially formatted text, reducing the image in both directions could take place either for the entire image, or even for selected portions of the image.

Figure 6:
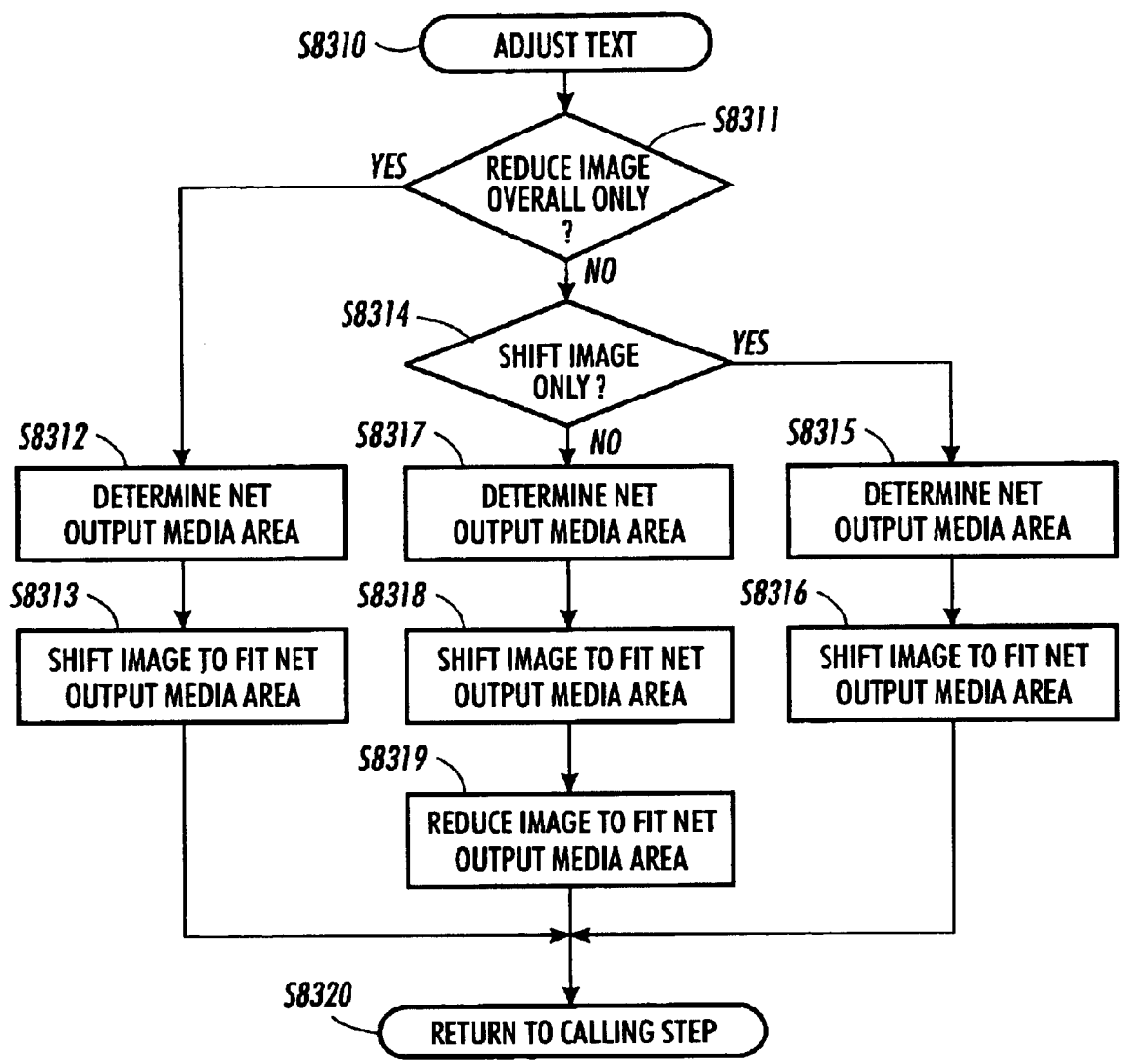
FIG. 6 is a flowchart outlining in greater detail one exemplary embodiment of the method for adjusting text of FIG. 5.

FIG. 6 is a flowchart outlining in greater detail one exemplary embodiment of the method for adjusting text of steps S8310 and S8370. Beginning in step S8310, operation proceeds to step S8311, where a determination is made whether the image will only be reduced in size. The determination may be made based on user input, or on a determination by the digital image forming apparatus. If the image will only be reduced, operation proceeds to step S8312. Otherwise, operation jumps to step S8314. In step S8312, the net output media area is determined. The reduction factor, i.e., the degree of reduction, may be determined for each image in the original document, or may be based on the size of the original document. Next, in step S8313, the image is reduced by the determined reduction factor so that the reduced image does not extend into the edge disturbance. Operation then jumps to step S8320.

In contrast, in step S8314, a determination is made whether the image is to be adjusted only by shifting the image. If the image will be adjusted only by shifting the image, operation proceeds to step S8315. Otherwise, operation jumps to step S8317. In step S8315, the net output media area and the distance by which the image must be shifted to avoid the edge disturbance are determined for the image. Then, in step S8316, the image is shifted by the determined distance. Operation then jumps to step S8320.

In step S8317, the net output media area, the scale of reduction for each image, and the distance by which the image must be shifted to avoid the edge disturbance are determined. Next, in step S8318, the image is shifted toward the opposite margin by the determined distance. Then, in step S8319, the image is reduced by the determined reduction scale factor usable to fit the image in the net output media area. Operation then continues to step S8320, where operation of the method is returned to the calling step, i.e., either to step S8310 or to step S8370.

It should be appreciated that, if the image is to be adjusted only by shifting the image, whether sufficient space exists in the opposite margin to accommodate the intrusion of the image into the margin space by the determined distance may be optionally determined. This optional determining step may occur after step S8315. Once completed, operation proceeds to step S8316 as described above.

In various exemplary embodiments, the default adjustment process may be set to maximize the size of the image in the net output media area. Thus, the area occupied by the original text is determined, and compared with the net output media area available. The minimum percentage reduction required to fit the net output media area is then selected as the reduction factor. It should be appreciated that this option may be based on user selection or a determination by the digital image forming apparatus.

In various exemplary embodiments, it may be desirable to reduce the text image in only one direction. Adjusting the image in this manner may be suitable, for example, where the text is located between the edge disturbance and a graphic image. The image forming apparatus may determine that sufficient space is available in the net output media area such that an overall reduction in the image size is not necessary. Instead, compression of the text in the appropriate direction (i.e., vertical or horizontal) may be enough to fit the image into the net output media area.

Figure 7:
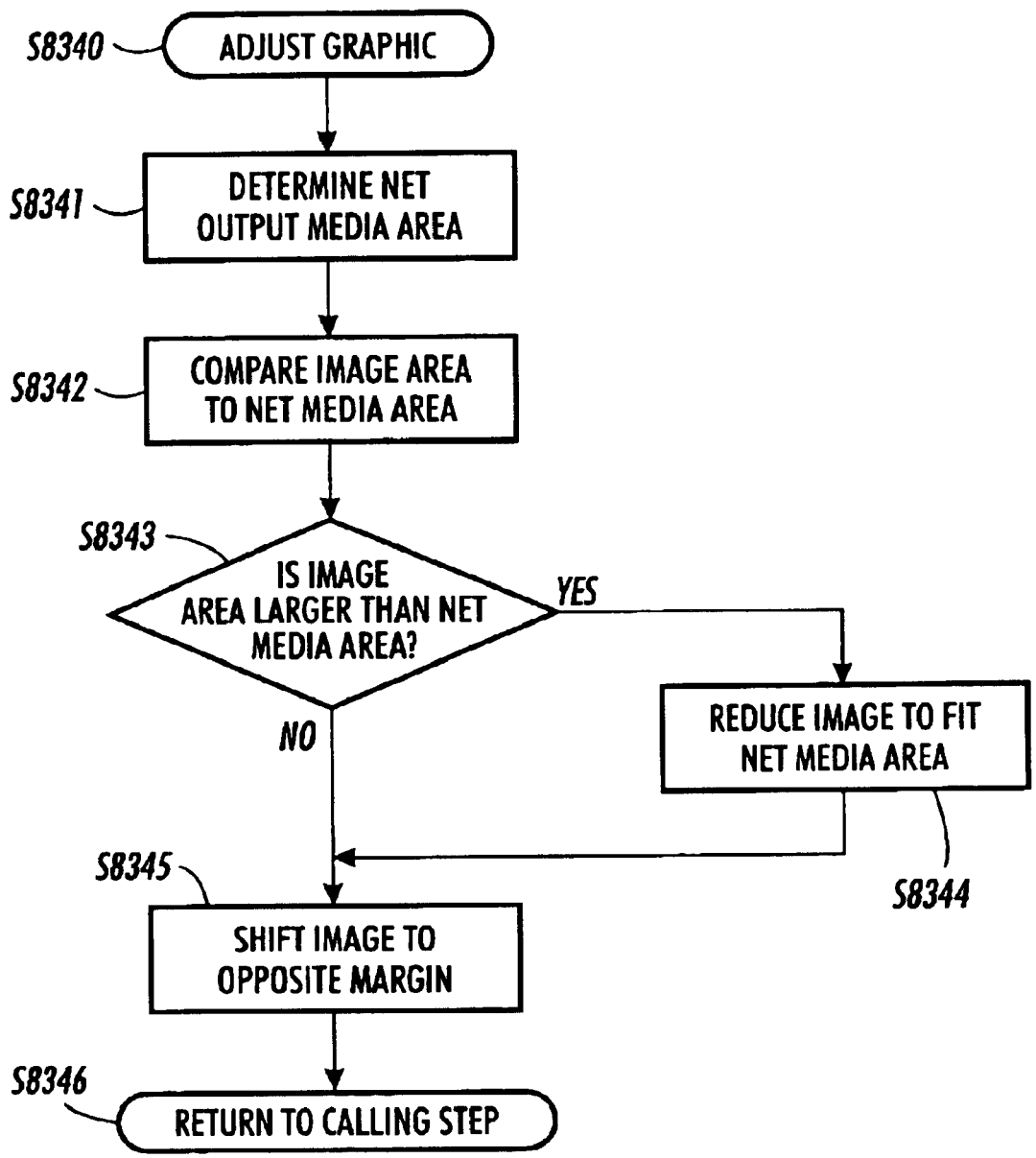
FIG. 7 is a flowchart outlining in greater detail one exemplary embodiment of the method for adjusting graphics of FIG. 5.

FIG. 7 is a flowchart outlining in greater detail one exemplary embodiment of the method for adjusting the graphics portions of steps S8340 and S8390. Since the aspect ratio of graphic images and/or special text must be preserved, there are fewer options for adjusting these images in comparison to those available for plain text images. Beginning in step S8340, operation proceeds to step S8341, where the net output media area is determined. Then in step S8342, the image area of the original document image is compared to the net output media area on the edge-disturbed output media. Next in step S8343, a determination is made whether the image area fits within the net output media area. If so, then operation jumps directly to step S8345. Otherwise, operation continues to step S8344.

In step S8344 the image is reduced. Then, in step S8345, the image is shifted towards the margin opposite the edge disturbance. Operation then continues to step S8346, where operation of the method is returned to the calling step, i.e. either step S8330 or step S8390.

Figure 8:
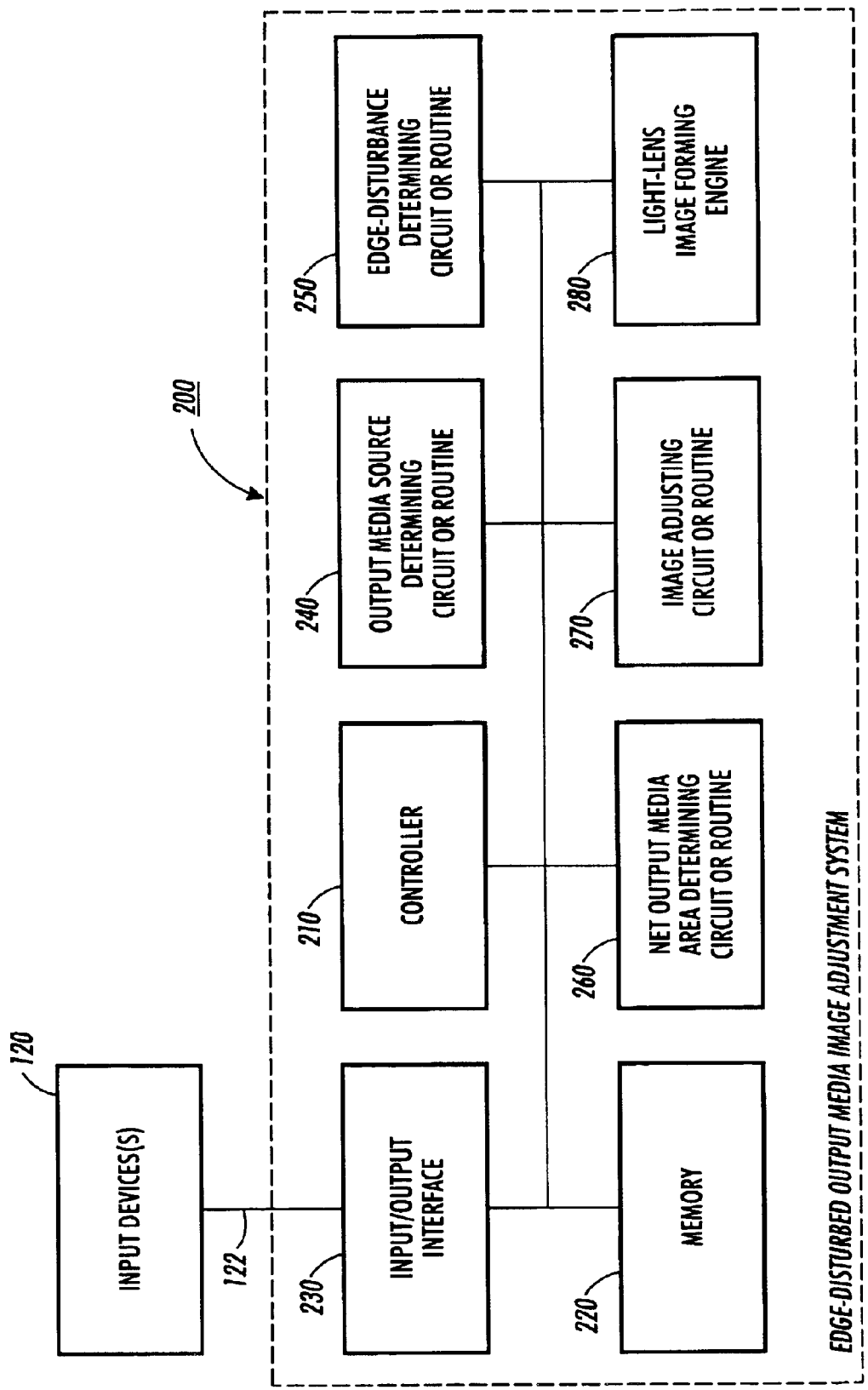
FIG. 8 is a block diagram of a system for adjusting an input document relative to a sheet of edge-disturbed output media for a light-lens image forming apparatus according to the invention.

FIG. 8 is a block diagram outlining one exemplary embodiment of an edge-disturbed output media image adjustment system 200 usable to adjust an input document image relative to a sheet of edge-disturbed output media according to this invention for a light-lens image forming apparatus. As shown in FIG. 8, the edge-disturbed output media image adjustment system 200 includes a controller 210, memory 220, an input/output interface 230, an output media source determining circuit or routine 240, an edge disturbance determining circuit or routine 250, a net output media area determining circuit or routine 260, an image adjusting circuit or routine 270, and a light-lens image forming engine 280. The controller 210 coordinates communication between all of the elements, circuits or software routines 220, 240, 250, 260, 270, and 280 during operation. One or more input devices 120 may be connected to the edge-disturbed output media image adjustment system 200 over a signal line or link 122.

In general, the image data source for a light-lens image forming apparatus is a hard copy of a text, graphic, or mixed image. However, any image that may be suitably captured using a light-lens could serve as a suitable image data source. The edge-disturbed output media image adjustment system 200 can be implemented as software executing on a programmed general purpose computer, a special purpose computer, a microprocessor or the like. The edge-disturbed output media image adjustment system 200 can be implemented by physically incorporating it into a software and/or hardware system, such as the hardware and software system of a light-lens photocopier.

The output media source determining circuit or routine 240 determines what output media source has been selected, either by the user, through one or more input devices, or set by the controller. Once the output media source has been determined, the edge disturbance determining circuit or routine 250 then determines whether the user has indicated that edge-disturbed media is present in the selected paper source or if the selected paper source itself has determined or indicates that it contains edge-disturbed media. If no edge-disturbed output media is detected or determined to be in the output media source, the edge disturbance determining circuit or routine 250 indicates to the controller 210 that no adjustment is necessary, and that the images generated do not need to be adjusted.

However, if the edge-disturbance determining circuit or routine 250 determines that edge-disturbed output media is present in the output media source, the edge-disturbance determining circuit or routine 250 indicates to the controller 210 that image adjustment is necessary.

Then, the net output media area determining circuit or routine 260 determines the net output media area available for imaging onto the selected output media. This determination may be made, for example, by determining the total output media area available for imaging based on the size of the edge-disturbed output media based on the type or nature of the edge disturbance present on the edge-disturbed output media. Depending on the type or nature of the edge disturbance present in the edge-disturbed media, the net output media area determining circuit or routine 260 may either select a predetermined adjustment factor or determine the appropriate adjustment factor based on its determination of the dimensions of the net output media area. The adjustment factor is applied to the total output media area to arrive at the net output media area available. For example, in the case of hole-punched paper, the adjustment may simply involve the reduction of the total output media area by subtracting sufficient space from the hole-punched margin. The net output media area determining circuit or routine 260 then forwards the information to the image adjusting circuit or routine 270.

Next, the size of the input media is determined and compared with the size of the net output media area of the edge-disturbed output media. It should be appreciated that determining the size of the input media and comparing it with the size of the net output media may be accomplished using any suitable currently available or after developed circuit or routine. Based on this comparison, the image adjusting circuit or routine 270 then determines an appropriate reduction factor based on the size of the input document sheet and the net image area of the output media, either dynamically or selected from a predetermined set of reduction scales, and reduces the size of light-lens image based on the determined reduction factor. Once the appropriate reduction factor has been determined, the light-lens image-forming engine 280 then captures the adjusted image and generates a copy of the adjusted image on the edge-disturbed output media.

It should be appreciated that, in some conventional light-lens image forming apparatus that include edge-disturbed output media image adjustment system 200, the net output media area determining circuit or routine 260 can be omitted. In exemplary embodiments where the net output media area determining circuit or routine 260 is absent, the image forming apparatus 200 may automatically reduce the image when the use of edge-disturbed media is detected. The reduction factors can be determined by comparing the dimensions of the original document with the net output media area determined for standardized edge-disturbed media and stored in the memory 220. For example, the reduction factor can be determined based on a comparison of letter sized paper and three-hole-punched letter sized paper. The reduction factor would be the percent reduction needed to fit the entire letter-sized original onto the net image area of the hole-punched sheet. This percentage would be stored in the memory 220 and applied when the edge-disturbed output media image adjustment system 200 detects that a letter-sized original is to be copied to a three-hole-punched letter sized sheet. It should be appreciated that the reduction factors can be similarly determined for media of different sizes as well (i.e., A4 to letter, letter to legal, etc.).

Figure 9:
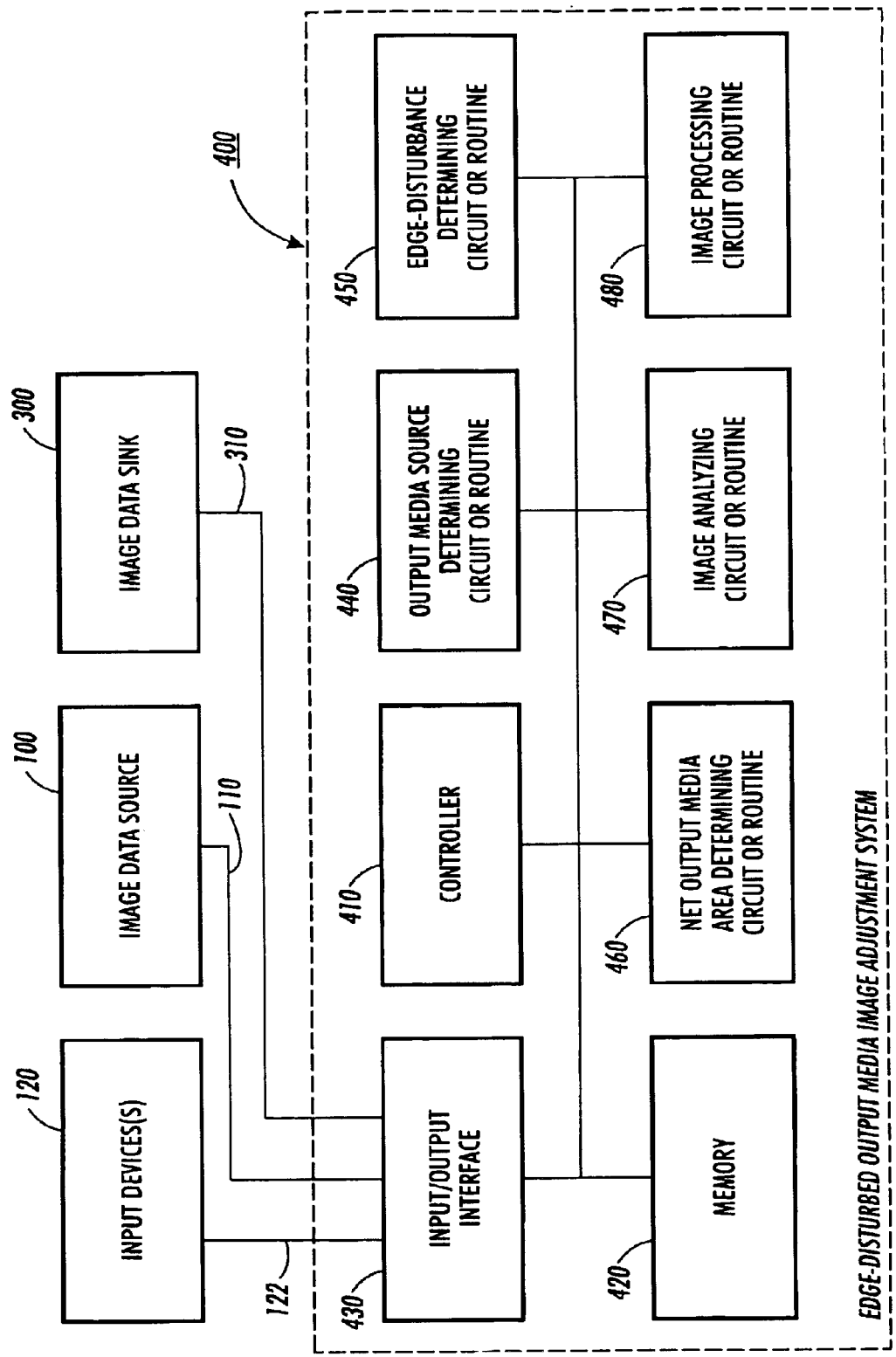
FIG. 9 is a block diagram of a system for adjusting an input document relative to a sheet of edge-disturbed output media for a digital image forming apparatus according to this invention.

FIG. 9 is a generalized functional block diagram outlining one exemplary embodiment of an edge-disturbed output media image adjustment system 400 usable to adjust an input document image relative to a sheet of edge-disturbed output media according to this invention for a digital image forming apparatus. As shown in FIG. 9, the edge-disturbed output media image adjustment system 400 includes an includes a controller 410, memory 420, an input/output interface 430, an output media source determining circuit or routine 440, an edge disturbance determining circuit or routine 450, a net output media area determining circuit or routine 460, an image analyzing circuit or routine 470, and an image processing circuit or routine 480. The controller 410 coordinates communication between all of the elements, circuits or software routines 420, 440, 450, 460, 470, and 480 during operation. One or more input devices 120 may be connected to the edge-disturbed output media image adjustment system 400 over a signal line or link 122.

In addition to the one or more input devices 120, the image adjustment system 400 is also connectable to an image data source 100 over a signal line or link 110. The image data source 100 provides input image data to the image adjustment system 400. The image adjustment system 400 is also connectable to an image data sink 300 over a signal line or link 310. The image data sink 300 receives the modified images generated by the image adjustment system 400.

It should be understood that many of the components of the image adjustment system 400 generally have corresponding counterparts in the image adjustment system 200 described above. The input devices 120, and the associated signal line or link 122, as well as the circuits 440–460 operate generally the same as in the system 200, unless otherwise indicated. Thus, only significant differences between the elements of the image adjustment system 400 and the image adjustment system 200 will be discussed.

It should be appreciated that the image data source 100 can be any one or more of a number of different sources, such as a scanner, a digital copier, a digital camera or any other suitable systems that generate digital image data, or an apparatus suitable for storing and/or transmitting digital image data, such as a client or server of a network, such as the Internet and especially the World Wide Web. Thus, the image data source can be any known or later-developed source that is capable of providing image data to the edge-disturbed output media image adjustment system 400.

In the image adjustment system 400, the image analyzing circuit or routine 470 determines the actual size and location of the input image relative to the net image area and the size and location of the edge disturbance, and optionally discriminates between different types of image data, such as graphics and text, in the input image data, as well as provides a more dynamic assessment of the dimensions of the image. Once the image data has been analyzed and optionally classified by the image analyzing circuit or routine 470, the image data may be sent to the image processing circuit or routine 480 or held in the memory 420. The controller 410 can forward the image data from the memory 420 to the image processing circuit 480 or routine at a later time.

The image processing circuit or routine 480 adjusts image data in the image adjustment system 400. The adjustments to image data are based on the nature and location of the edge disturbance, as determined by the edge disturbance determining circuit or routine 450, the net output media area, determined by the net output area determining circuit or routine 460, and the size, location and/or type of image, as determined by the image analyzing circuit or routine 470.

Based on the information it receives, the image processing circuit or routine 480 adjusts image data by reducing and/or shifting the image data as appropriate.

The image processing circuit or routine 480 is more flexible in the types of the adjustments that are possible in comparison with the light-lens system shown in FIG. 8. The additional options available with the digital system have been described in various exemplary embodiments of the methods described above, but include, for example, shifting the image toward the margin opposite the edge-disturbance, segmenting the image and adjusting different image types on the same page independently. The digital controls also permit adjusting text images on line-by-line basis.

The image forming apparatus, whether it is light-lens or digital apparatus, can detect output media having an edge disturbance as it comes off the paper tray. Once the edge-disturbed media is detected, the image forming apparatus can adjust the setting of the machine automatically to adjust the image data so that the image does not extend over the edge disturbance present in the output media.

It should be appreciated that above-outlined descriptions of the systems and methods according to this invention can apply equally well to adjusting images to be formed on output media having virtual edge disturbances. Options can be presented to the user who intends to make edge-disturbances in the output media to adjust the image accordingly. Thus, instead of detecting the edge-disturbances present in the output media, the image will be adjusted based on known parameters of the virtual edge-disturbances. Exemplary virtual disturbances may include, for example, stapled output media, edge bound output media, spiral bound output media, and/or GBC-bound output media, or output media includes any other known or later-developed edge disturbance created after the image is formed on the output media.

It is also possible that the user may load the edge-disturbed output media with the edge-disturbance in any orientation. In various exemplary embodiments of this invention, the image-forming apparatus may be set up to detect the side of the output media on which the edge disturbance is present, and adjust the image accordingly.

While the invention has been described in conjunction with the exemplary embodiments outlined above, it is evident that many alternatives, modifications and variations will be apparent to those skilled in the art. As explained above, although the exemplary embodiments of the invention analyze and determine the method of adjusting an output image to avoid an edge disturbance present in a piece of output media, the invention can be changed to modify the type of adjustment made based on customer preferences. Accordingly, the exemplary embodiments of the invention as set forth above are intended to be illustrative, not limiting. Various changes may be made without departing from the spirit and scope of the invention as defined in the following claims.

What is claimed is:

1. A method for adjusting an input image to reduce an amount of an output image placed over an edge disturbance present in an output media, comprising:
   inputting a source document comprising the input image;
   adjusting the input image relative to a net image output area available on the output media to reduce the amount of the input image that extends over the edge disturbance present in the output media; and
   generating a copy of the adjusted input image on the output media.

2. A method according to claim 1, wherein adjusting the input image comprises adjusting at least one of a horizontal or a vertical position of the original input image towards a margin opposite the edge disturbance present in the output media.

3. A method according to claim 2, wherein adjusting the input image comprises shifting the position of the input image toward a margin opposite the edge disturbance present in the output media.

4. A method according to claim 2, wherein adjusting the input image comprises adjusting at least one of a horizontal dimension and a vertical dimension of the original input image with respect to the original image.

5. A method according to claim 4, wherein adjusting the input image comprises reducing at least one of the horizontal dimension and the vertical dimension of the original input image with respect to the original image.

6. A method according to claim 1, wherein adjusting the input image comprises adjusting at least one of a horizontal dimension and a vertical dimension of the original input image with respect to the original image.

7. A method according to claim 6, wherein adjusting the input image comprises reducing at least one of the horizontal dimension and the vertical dimension of the original input image with respect to the original image.

8. A method according to claim 1, further comprising detecting the presence of edge-disturbed output media in an output media source.

9. A method according to claim 1, wherein adjusting the input image comprises:
   determining a size of the net output media area available for imaging,
   comparing a size of the input image to the size of the net output media area available for imaging;
   determining a reduction factor usable in at least one of a horizontal direction and vertical direction of the original input image to adjust the input image relative to the net output media area available for imaging; and
   reducing the original input image by the determined reduction factor.

10. A method according to claim 1, wherein adjusting the input image comprises:
    determining the position of a text image; and
    adjusting the text image.

11. A method according to claim 10, wherein adjusting the input image further comprises at least one of shifting the position of the text image and reducing the text image.

12. A method according to claim 1, wherein adjusting the input image further comprises:
    determining the position of a graphic image; and
    adjusting the graphic image.

13. A method according to claim 12, wherein adjusting the input image further comprises at least one of reducing the graphic image and shifting the position of the graphic image.

14. A method according to claim 12, wherein adjusting the graphic image comprises:
    reducing the size of the original input image if the input image area is larger than the net output media area available for imaging; and
    shifting the input image toward the margin opposite the edge disturbance in the output media.

15. A method according to claim 1, wherein adjusting the input image further comprises:
    determining the positions of text portions and graphic portions of the original input image;

adjusting the text portions of the input image by at least one of shifting the position of the text image and reducing the text image; and adjusting the graphic portions of the input image by at least one of reducing the graphic image, and shifting the position of the graphic image.

16. A method according to claim 1, wherein adjusting the input image comprises:

adjusting at least one of the horizontal or vertical position of the original input image towards the margin opposite the edge-disturbance present in the output media; and adjusting at least one of the horizontal and vertical dimension of the original input image with respect to the original image.

17. A method according to claim 1, wherein the edge-disturbed output media is a hole-punched sheet of paper or a transparency having a non-imaging stripe.

18. The method of claim 1, wherein, when the edge disturbance is a virtual edge disturbance, the method further comprises determining the net image output area based on a size of the virtual edge disturbance, such that, if the output media is subsequently edge-disturbed according to the virtual edge disturbance, the amount of the input image that extends into an edge disturbed portion of the output media is reduced relative to the input image before being adjusted.

19. A system that adjusts an image to reduce an amount of an output image placed over an edge disturbance in an output media, comprising:

an edge-disturbed output media detecting circuit or routine that detect the presence of edge disturbed output media in an output media source, an input image adjusting circuit or routine that adjusts the input image relative to the net image output area available on the output medium to reduce the amount of the input image that extends over the edge disturbance present in the output media, and an output image generating circuit or routine, which generates the adjusted input image on the output medium.

20. A method for adjusting an input image to reduce an amount of an output image placed over an edge disturbance present in an output media, comprising:

inputting a source document comprising the input image;

determining a size of the net output media area available for imaging;

comparing a size of the input image to the size of the net output media area available for imaging;

determining a reduction factor usable in at least one of a horizontal direction and vertical direction of the original input image to adjust the input image relative to the net output media area available for imaging;

reducing the original input image by the determined reduction factor; and generating a copy of the adjusted input image on the output media.

* * * * *